US012602684B2

(12) United States Patent
Faruqui

(10) Patent No.: US 12,602,684 B2
(45) Date of Patent: Apr. 14, 2026

(54) END-TO-END CREDENTIAL PROVISIONING AND TRANSACTION AUTHORIZATION

(71) Applicant: Apple Inc., Cupertino, CA (US)

(72) Inventor: Abde N. Faruqui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 153 days.

(21) Appl. No.: 18/226,746

(22) Filed: Jul. 26, 2023

(65) Prior Publication Data

US 2024/0330921 A1 Oct. 3, 2024

Related U.S. Application Data

(60) Provisional application No. 63/455,245, filed on Mar. 28, 2023.

(51) Int. Cl.
*G06Q 20/40* (2012.01)

(52) U.S. Cl.
CPC .................................. *G06Q 20/40* (2013.01)

(58) Field of Classification Search
None
See application file for complete search history.

(56) References Cited

U.S. PATENT DOCUMENTS 8,738,451 B2 * 5/2014 Ahlers ................. G06Q 20/105
705/37
10,601,796 B2 * 3/2020 Adams ................ H04W 12/086

10,902,421 B2 * 1/2021 Badenhorst ............ G06Q 20/42
11,398,910 B2 * 7/2022 Girish .................... H04L 9/3247
11,631,076 B1 * 4/2023 Ho ...................... G06Q 20/4014
705/41
11,694,180 B2 * 7/2023 Arthur ................. G06Q 20/322
455/435.1
11,699,152 B2 * 7/2023 Scott ...................... G06Q 20/36
705/40
2004/0019564 A1 * 1/2004 Goldthwaite ........ G06Q 20/425
705/44
2023/0142487 A1 * 5/2023 Shastry ............ G06Q 20/38215
705/64

* cited by examiner

*Primary Examiner* — Christopher Bridges
(74) *Attorney, Agent, or Firm* — BAKERHOSTETLER

(57) ABSTRACT

The subject system may be implemented by a processor circuit configured to receive a payment credential request from a user device, wherein the payment credential request comprises a requested amount and indicates a product type, provision, in response to the payment credential request and based at least in part on the product type, a payment credential and a payment account corresponding to the payment credential, wherein the payment account is associated with a balance corresponding to the requested amount, receive, from a merchant system, an indication of an authorization amount and the payment credential, authorize, based at least in part on the balance associated with the payment account, payment of the authorization amount to the merchant system, in response to receiving the indication, and update the balance associated with the payment account based at least in part on the authorization amount, in response to authorizing the payment.

20 Claims, 9 Drawing Sheets

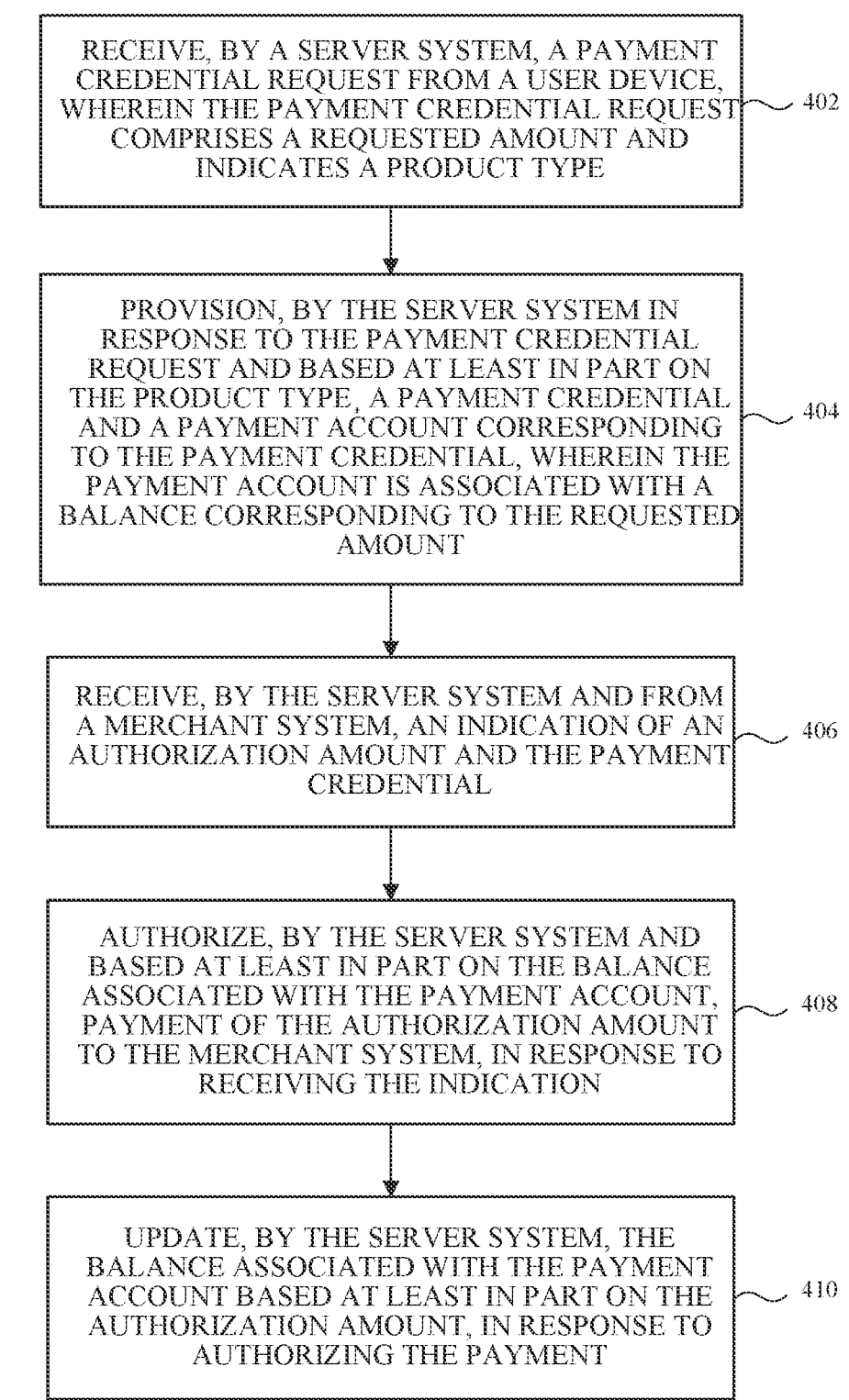

400

RECEIVE, BY A SERVER SYSTEM, A PAYMENT
CREDENTIAL REQUEST FROM A USER DEVICE,
WHEREIN THE PAYMENT CREDENTIAL REQUEST
COMPRISES A REQUESTED AMOUNT AND
INDICATES A PRODUCT TYPE — 402

PROVISION, BY THE SERVER SYSTEM IN
RESPONSE TO THE PAYMENT CREDENTIAL
REQUEST AND BASED AT LEAST IN PART ON
THE PRODUCT TYPE, A PAYMENT CREDENTIAL
AND A PAYMENT ACCOUNT CORRESPONDING
TO THE PAYMENT CREDENTIAL, WHEREIN THE
PAYMENT ACCOUNT IS ASSOCIATED WITH A
BALANCE CORRESPONDING TO THE REQUESTED
AMOUNT — 404

RECEIVE, BY THE SERVER SYSTEM AND FROM
A MERCHANT SYSTEM, AN INDICATION OF AN
AUTHORIZATION AMOUNT AND THE PAYMENT
CREDENTIAL — 406

AUTHORIZE, BY THE SERVER SYSTEM AND
BASED AT LEAST IN PART ON THE BALANCE
ASSOCIATED WITH THE PAYMENT ACCOUNT,
PAYMENT OF THE AUTHORIZATION AMOUNT
TO THE MERCHANT SYSTEM, IN RESPONSE TO
RECEIVING THE INDICATION — 408

UPDATE, BY THE SERVER SYSTEM, THE
BALANCE ASSOCIATED WITH THE PAYMENT
ACCOUNT BASED AT LEAST IN PART ON THE
AUTHORIZATION AMOUNT, IN RESPONSE TO
AUTHORIZING THE PAYMENT — 410

FIG. 4

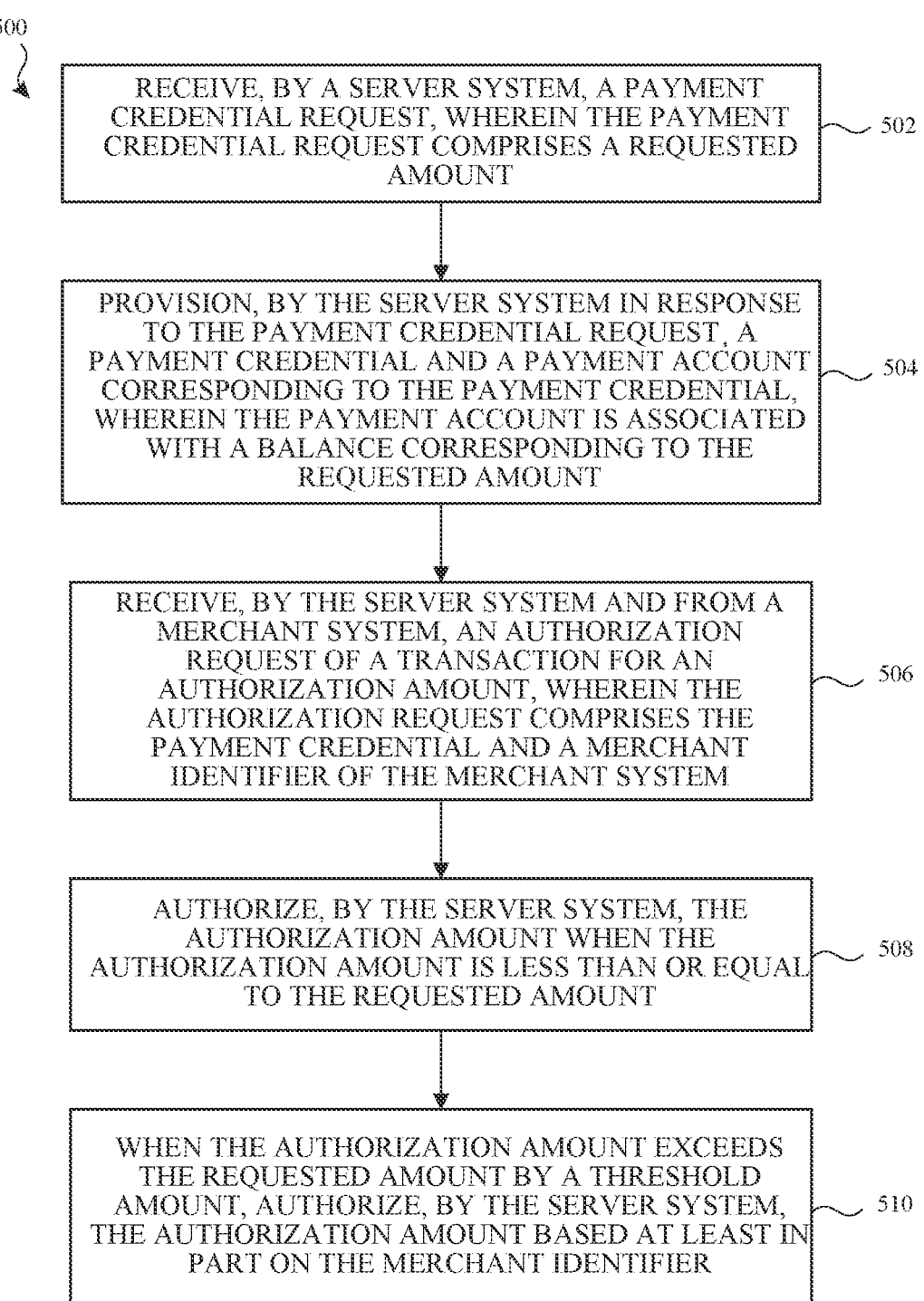

500

RECEIVE, BY A SERVER SYSTEM, A PAYMENT CREDENTIAL REQUEST, WHEREIN THE PAYMENT CREDENTIAL REQUEST COMPRISES A REQUESTED AMOUNT — 502

PROVISION, BY THE SERVER SYSTEM IN RESPONSE TO THE PAYMENT CREDENTIAL REQUEST, A PAYMENT CREDENTIAL AND A PAYMENT ACCOUNT CORRESPONDING TO THE PAYMENT CREDENTIAL, WHEREIN THE PAYMENT ACCOUNT IS ASSOCIATED WITH A BALANCE CORRESPONDING TO THE REQUESTED AMOUNT — 504

RECEIVE, BY THE SERVER SYSTEM AND FROM A MERCHANT SYSTEM, AN AUTHORIZATION REQUEST OF A TRANSACTION FOR AN AUTHORIZATION AMOUNT, WHEREIN THE AUTHORIZATION REQUEST COMPRISES THE PAYMENT CREDENTIAL AND A MERCHANT IDENTIFIER OF THE MERCHANT SYSTEM — 506

AUTHORIZE, BY THE SERVER SYSTEM, THE AUTHORIZATION AMOUNT WHEN THE AUTHORIZATION AMOUNT IS LESS THAN OR EQUAL TO THE REQUESTED AMOUNT — 508

WHEN THE AUTHORIZATION AMOUNT EXCEEDS THE REQUESTED AMOUNT BY A THRESHOLD AMOUNT, AUTHORIZE, BY THE SERVER SYSTEM, THE AUTHORIZATION AMOUNT BASED AT LEAST IN PART ON THE MERCHANT IDENTIFIER — 510

*FIG. 5A*

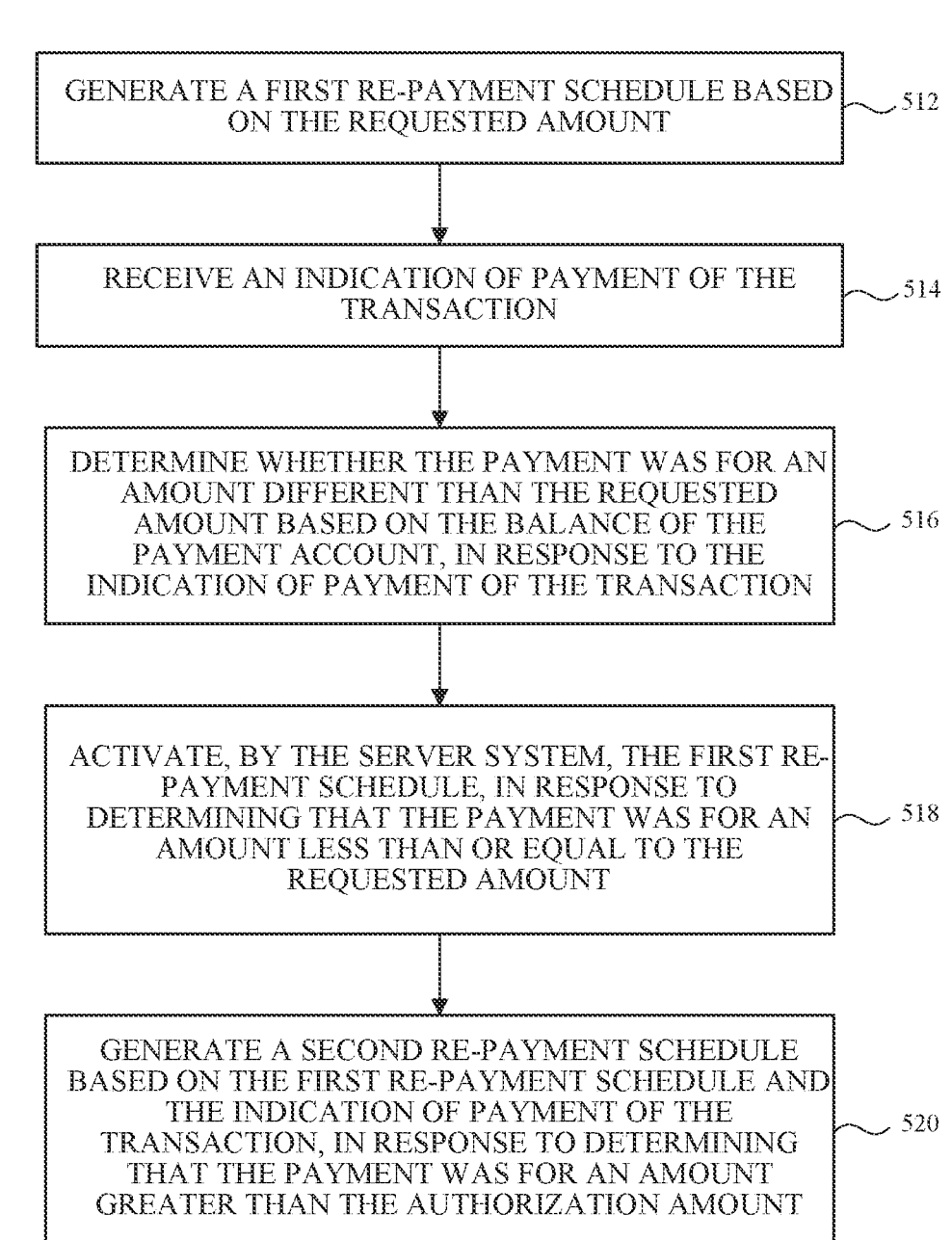

500

GENERATE A FIRST RE-PAYMENT SCHEDULE BASED ON THE REQUESTED AMOUNT — 512

RECEIVE AN INDICATION OF PAYMENT OF THE TRANSACTION — 514

DETERMINE WHETHER THE PAYMENT WAS FOR AN AMOUNT DIFFERENT THAN THE REQUESTED AMOUNT BASED ON THE BALANCE OF THE PAYMENT ACCOUNT, IN RESPONSE TO THE INDICATION OF PAYMENT OF THE TRANSACTION — 516

ACTIVATE, BY THE SERVER SYSTEM, THE FIRST RE-PAYMENT SCHEDULE, IN RESPONSE TO DETERMINING THAT THE PAYMENT WAS FOR AN AMOUNT LESS THAN OR EQUAL TO THE REQUESTED AMOUNT — 518

GENERATE A SECOND RE-PAYMENT SCHEDULE BASED ON THE FIRST RE-PAYMENT SCHEDULE AND THE INDICATION OF PAYMENT OF THE TRANSACTION, IN RESPONSE TO DETERMINING THAT THE PAYMENT WAS FOR AN AMOUNT GREATER THAN THE AUTHORIZATION AMOUNT — 520

FIG. 5B

END-TO-END CREDENTIAL PROVISIONING AND TRANSACTION AUTHORIZATION

CROSS-REFERENCE TO RELATED APPLICATIONS

The present application claims the benefit of U.S. Provisional Patent Application Ser. No. 63/455,245, entitled "END-TO-END CREDENTIAL PROVISIONING AND TRANSACTION AUTHORIZATION," filed Mar. 28, 2023, which is hereby incorporated herein by reference in its entirety and made part of the present U.S. Utility patent application for all purposes.

TECHNICAL FIELD

The present description generally relates to transactions on electronic devices and, more particularly, to end-to-end payment credential provisioning and transaction authorization.

BACKGROUND

Mobile payment and electronic wallets offer convenience and security by eliminating the need to carry physical payment cards, thereby reducing the risk of fraud and theft. They are becoming increasingly popular as more merchants accept mobile payments and more users seek to simplify their payment processes.

BRIEF DESCRIPTION OF THE DRAWINGS

Certain features of the subject technology are set forth in the appended claims. However, for the purpose of explanation, several implementations of the subject technology are set forth in the following figures.

FIG. 4 depicts a flow diagram of an example process for transaction authorization, in accordance with one or more implementations.

FIGS. 5A-5B depict a flow diagram of an example process for modifying a financial product, in accordance with one or more implementations.

DETAILED DESCRIPTION

Figure 1:
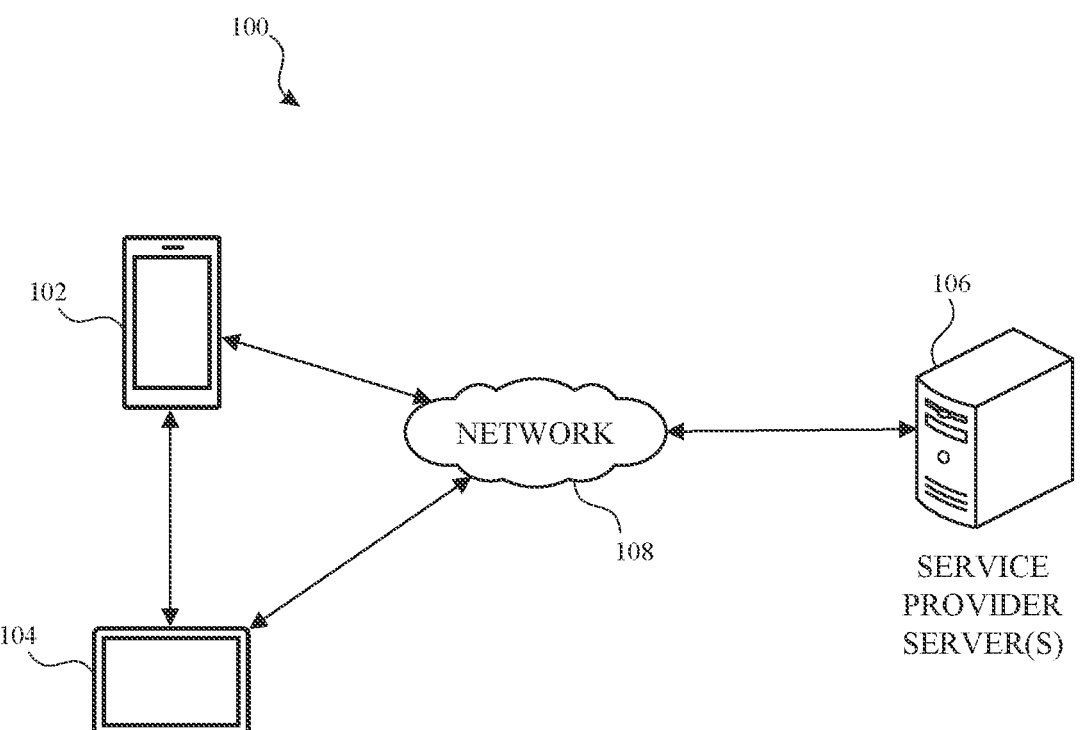
FIG. 1 illustrates an example network environment for mobile payment, in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic wallets allow users to store their payment information securely on their electronic devices and then use that information to make payments in person, in-app, or online. Electronic wallets use various security measures to protect a user's payment information, including tokenization, encryption, and/or biometric authentication. Tokenization involves replacing sensitive data, such as credit card numbers, with a unique token that can be used for transactions without revealing the actual credit card information.

When a user initiates a transaction with a merchant via an electronic wallet, multiple interactions happen between multiple entities. In one approach for initiating a transaction, a bank that issued a payment method is contacted by both the user and the merchant at some point for the transaction between the user and the merchant. For example, to obtain the payment method in the electronic wallet, the user's device must contact the issuer bank (e.g., prior to initiating the transaction) to receive a tokenized version of the payment method to store in the electronic wallet and provide to the merchant. To receive funds from a transaction, the merchant's device must also contact the issuer bank to request authorization for the transaction and then to clear the funds (which may occur sometime after the transaction). Because both sides of the transaction (the user and the merchant) consult with the issuer bank, the transaction is limited to the rules, speed, financial products, and the like, of the issuer bank.

Aspects of the subject technology introduce a service that can provision payment methods to an electronic wallet on the user end and authorize transactions on the merchant end without disrupting the merchant's payment processing workflow. One benefit of such an approach would be greater control over the payment experience, allowing the service provider to offer the user a more seamless and integrated payment experience. In addition, the service provider may have access to more detailed transaction and user account data, which could help improve its analytics and insights into user behavior. This could help the service provider to better understand user preferences and offer more personalized financial products and services. Furthermore, the service provider could originate new financial products, such as credit or lending products, backed by the payment data it collects from users. For example, the service provider could use its data to offer a more streamlined loan application and approval process.

FIG. 1 illustrates an example network environment 100 for mobile payment, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 may include a user device 102, a merchant device 104, and one or more servers (e.g., service provider server 106). The network 108 may communicatively (directly or indirectly) couple the user device 102, merchant device 104, and/or the service provider server 106. In one or more implementations, the network 108 may be an interconnected network of devices that may include, or may be communicatively coupled to, the Internet. For explanatory purposes, the network environment 100 is illustrated in FIG. 1 as including the user device 102, merchant device 104, and the service provider server 106; however, the network environment 100 may include any number of electronic devices and/or any number of servers communicatively coupled to each other directly or via the network 108.

The user device 102 may be, for example, a wearable device such as a watch, a band, and the like, a desktop computer, a portable computing device such as a laptop computer, a smartphone, a peripheral device (e.g., a digital camera, headphones), a tablet device, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the user device 102 is depicted as a smartphone. The user device 102 may be, and/or may include all or part of, the electronic system discussed below with respect to FIG. 8 and may be associated with a user account. For example, the user device 102 may be registered to a user account with the service provider server 106.

The merchant device 104 may be a similar electronic device as described with respect to the user device 102. In FIG. 1, by way of example, the merchant device 104 is depicted as a tablet, which may be a merchant payment terminal. The merchant device 104 may be, and/or may include all or part of, the electronic system discussed below with respect to FIG. 7. The merchant device 104 may be configured to perform transactions with digital payment credentials, such as from the user device 102.

The service provider server 106 may provision payment credentials onto electronic devices (e.g., the user device 102). Payment credentials may include one or more identifiers in the form of a code, a signal (e.g., an NFC signal), and the like. In some variations, the service provider server 106 includes one or more app-specific modules (e.g., plugins) (and/or separate servers) that perform operations for a respective application (e.g., tokenizing and/or provisioning payment credentials). In one or more implementations, a payment credential may be provisioned as an applet on a secure element of the user device 102, such as by the service provider server 106, and/or a payment credential may be stored in memory and managed/accessed by a host or application processor of the user device 102.

The service provider server 106 may store account information (e.g., user account, usernames/handles, or any other account-specific data) associated with the user device 102 and/or users thereof and/or users associated therewith. In one or more implementations, one or more servers (e.g., the service provider server 106) may provide payment credentials that are to be provisioned (e.g., stored) on or at a device (e.g., the user device 102) by an application, operating system, and/or secure element of the device. In one or more implementations, the user device 102 may be communicatively coupled to the merchant device 104 to provide a payment credential to the merchant device 104.

Figure 2:
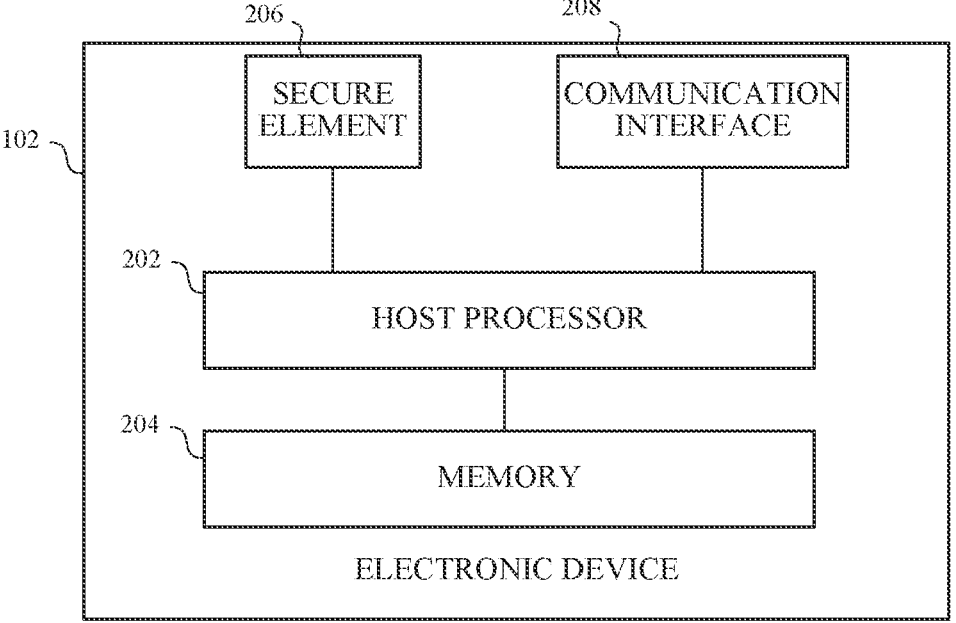
FIG. 2 depicts an example electronic device that may implement the subject methods and systems, in accordance with one or more implementations.

FIG. 2 depicts an example user device 102 that may implement the subject methods and systems, in accordance with one or more implementations. For explanatory purposes, FIG. 2 is primarily described herein with reference to the user device 102 of FIG. 1. However, this is merely illustrative, and features of the electronic device of FIG. 2 may be implemented in any other electronic device for implementing the subject technology. Not all of the depicted components may be used in all implementations, however, and one or more implementations may include additional or different components than those shown in FIG. 2. Variations in the arrangement and type of the components may be made without departing from the spirit or scope of the claims as set forth herein. Additional components, different components, or fewer components may be provided.

The user device 102 may include one or more of a host processor 202, a memory 204, a secure element 206, and/or a communication interface 208. The host processor 202 may include suitable logic, circuitry, and/or code that enable processing data and/or controlling operations of the user device 102. In this regard, the host processor 202 may be enabled to provide control signals to various other components of the user device 102. The host processor 202 may also control transfers of data between various portions of the user device 102. The host processor 202 may further implement an operating system or may otherwise execute code to manage operations of the user device 102.

The memory 204 may include suitable logic, circuitry, and/or code that enable storage of various types of information such as received data, generated data, code, and/or configuration information. The memory 204 may include volatile memory (e.g., random access memory (RAM)) and/or non-volatile memory (e.g., read-only memory (ROM), flash, and/or magnetic storage). In one or more implementations, the memory 204 may store user location data, track data (e.g., lane information), exercise data (e.g., biometrics), account data, and any other data generated in the course of performing the processes described herein.

The secure element 206 may include hardware that provides secure storage and management of sensitive information. The secure element 206 may be securely isolated from the host processor 202 and/or operating system, making it more difficult for unauthorized access. The secure element 206 may be used for secure transactions and identification, such as in payment credentials, and the like. The secure element 206 may store sensitive information, such as cryptographic keys, and may protect the sensitive information with cryptographic algorithms and access controls. For example, the secure element 206 may include a hardware specific private key that is provisioned on the secure element 206 at or near the time of manufacture. The use of the secure element 206 provides an additional layer of security for sensitive information and helps to ensure its confidentiality in case the user device 102 is lost or compromised.

The communication interface 208 may include suitable logic, circuitry, and/or code that enables wired or wireless communication, such as between the user device 102 and the service provider server 106. The communication interface 208 may include, for example, one or more of a Bluetooth communication interface, an NFC interface, a Zigbee communication interface, a WLAN communication interface, a USB communication interface, a cellular interface, or generally any communication interface.

In one or more implementations, one or more of the host processor 202, the memory 204, the secure element 206, the communication interface 208, and/or one or more portions thereof may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
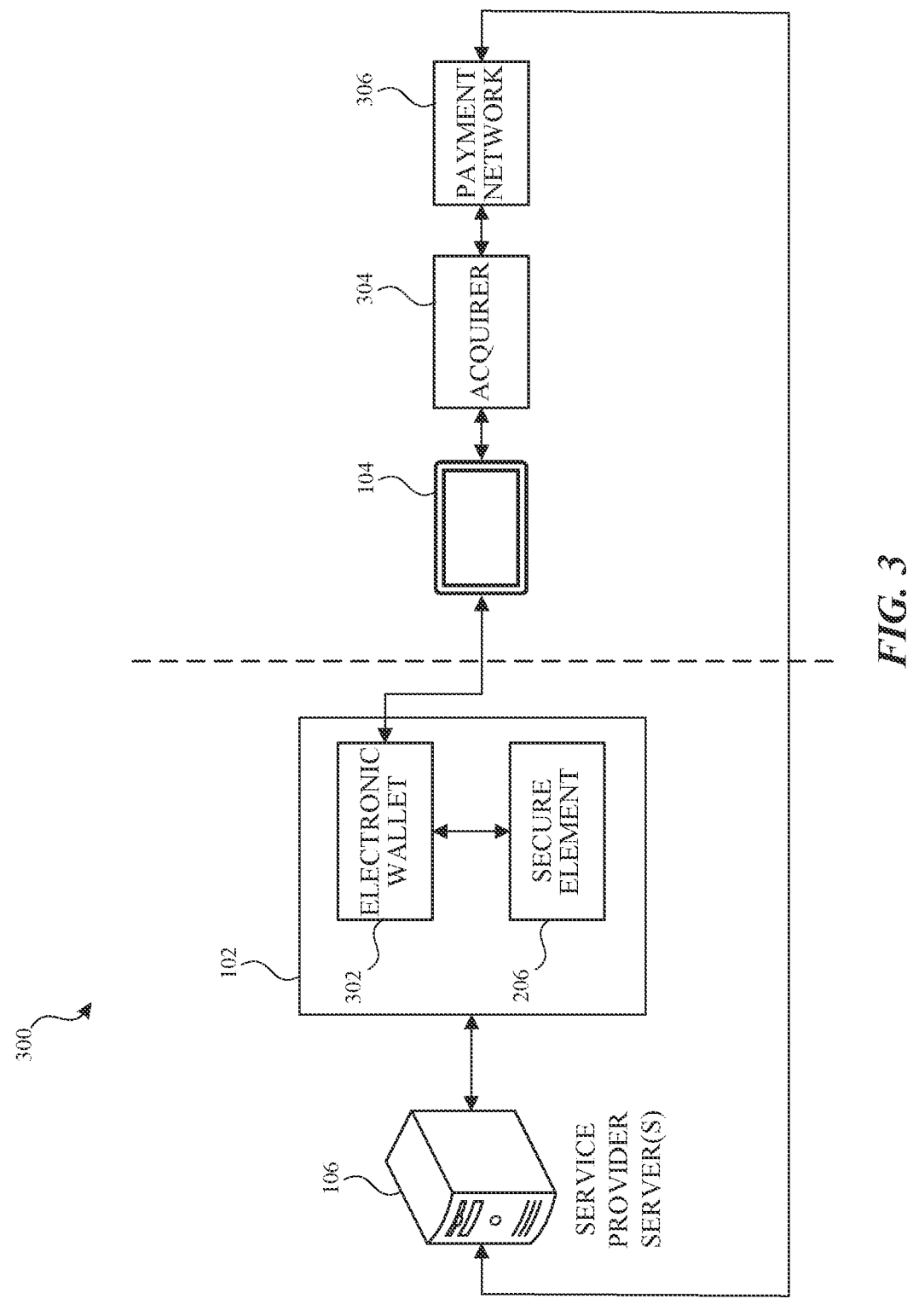
FIG. 3 depicts an example end-to-end payment channel, in accordance with one or more implementations.

FIG. 3 depicts an example end-to-end payment channel 300, in accordance with one or more implementations. Not all of the depicted components may be used in all implementations, however, and one or more implementations may include additional or different components than those shown in FIG. 2. Variations in the arrangement and type of the components may be made without departing from the spirit or scope of the claims as set forth herein. Additional components, different components, or fewer components may be provided.

As described above, one approach for performing transactions with an electronic wallet 302 between a user device 102 of the user and a merchant device 104 of the merchant would involve both the user device 102 and the merchant device 104 communicating with a bank who would provision payment credentials to the user and separately evaluate authorization/clearing requests from the merchant. In one or more implementations of the subject technology, performing transactions with an electronic wallet 302 between the user and merchant may place a service provider server 106 at both ends of the transaction. Because the service provider server 106 may perform tokenization and authorization, the service provider server 106 may have access to transaction data that may allow it to provide (e.g., originate and modify) different financial products, such as mortgages, personal loans, lines of credit, and/or the like.

Take, for example, a "pay later" loan, which is an installment loan that divides the purchase into multiple partial payments. The first payment may be due at checkout, while the remaining payments may be billed to a debit card (or another re-payment method) for each installment. The service provider server 106 may receive a request from the user device 102 for the loan. The request may include information such as user identifying information (e.g., the user's name) and/or account number of the user, an amount, a re-payment credential (e.g., debit card number), and any other lending-related information. The service provider server 106 may approve or reject the loan request based on factors including the prior transactions, re-payment history, and other user information. Once the loan is approved, the service provider server 106 may provision an account having a limit for which the user is approved and may also provision a payment credential corresponding to the account on the user device 102.

When the account is provisioned, the service provider server 106 may provision payment credentials for transactions funded from the account. A payment credential may be provisioned synchronously or asynchronously with a corresponding transaction, which may take place locally via the merchant device 104 and/or remotely via a merchant server. Provisioning the payment credential may include verifying that the user has sufficient funds for at least the first partial re-payment to the loan. In one or more implementations, the payment credential may be a "shared payment account number" (SPAN) that may resemble a payment card number, such as a credit card number or a debit card number.

To make the purchase, the user may interact with an interface associated with the electronic wallet 302 to cause the payment credential to be provided to the merchant device 104 of the merchant (and/or to a merchant server). For example, the payment credential may be a cryptographic token transmitted via an NFC point-of-sale terminal or over a wide area network to a remote server.

When the merchant, at merchant device 104, receives the payment credential for the purchase, the merchant may utilize the payment credential as it would any other payment credential, such as a primary account number (PAN) (e.g., a credit card number). The transaction information, including the payment credential and the transaction amount, may be passed to an acquirer 304 that the merchant uses to process electronic payments from customers. The acquirer 304 may then route the transaction information to the appropriate payment network 306 (e.g., Visa® or Mastercard®), which then sends the request to the payment credential issuer for authorization, which in this scenario is the service provider server 106. The service provider server 106 may authorize the payment, which may cause the transaction amount to be charged to the provisioned account, thereby increasing the balance on the account by the transaction amount.

Because the service provider server 106 provisions the payment credential and authorizes the transactions, the service provider server 106 may receive transaction information that may allow it to modify aspects (e.g., terms) of the loan based on information received from the user and/or the merchant. For example, if the merchant reverses part of the transaction although the user has already made one re-payment, then the service provider server 106 may re-calculate the remaining three partial re-payments accordingly.

FIG. 4 depicts a flow diagram of an example process 400 for transaction authorization, in accordance with one or more implementations. For explanatory purposes, the process 400 is primarily described herein with reference to the user device 102, the merchant device 104, and the service provider server 106 of FIG. 1. However, the process 400 is not limited to the user device 102, the merchant device 104, or the service provider server 106, and one or more blocks of the process 400 may be performed by one or more other components of the service provider server 106, and/or by other suitable devices. Further, for explanatory purposes, the blocks of the process 400 are described herein as occurring sequentially or linearly. However, multiple blocks of the process 400 may occur in parallel. In addition, the blocks of the process 400 need not be performed in the order shown and/or one or more blocks of the process 400 need not be performed and/or can be replaced by other operations.

At block 402, a server system (e.g., the service provider server 106) may receive a payment credential request from a user device (e.g., the user device 102). The payment credential request may include a requested amount and may indicate a product type, such as a "pay later" loan, which may be a loan that allows the user to buy a product from a merchant now but pay for the product later, e.g., in installments. In one or more implementations, the payment credential request may also include user information such as name, address, payment credential, or any other information relevant payment information, which may, for example, be used in determining the user's eligibility for the type of financial product.

At block 404, after the service provider server 106 verifies that the user is eligible for the requested product type, the service provider server 106 may provision a payment credential. The payment credential may be a cryptogram, a SPAN, or any other form of payment token. The service provider server 106 may generate and provision the payment credential itself and/or may request a payment credential to be provisioned from a remote payment credential service (e.g., from a bank associated with the service provider server 106).

The service provider server 106 may also provision a payment account corresponding to the payment credential. The payment account may have a credit limit corresponding to the requested amount or another amount that the service provider server 106 determines the user is authorized to utilize for a particular financial product. For example, if the service provider server 106 determines that the user may be eligible for a $5000 pay later loan, the service provider server 106 may open a payment account with a $5000 credit limit, which may be utilized via the payment credential of the payment account as well as other payment credentials which may be subsequently generated for the use for other pay later loan transactions. The determination may be based on, for example, a payment history of the user, amount of funds associated with a payment credential provided in the request, and any other user information.

At block 406, the service provider server 106 may receive an indication of an authorization amount and the payment credential from a merchant system (e.g., the merchant device 104). The indication of the authorization amount may be an authorization request for a transaction initiated by the user. For example, the user may initiate a transaction at the merchant device 104 by providing (e.g., online or in person) the payment credential to the merchant device 104, and in response the merchant device 104 may send an authorization request to the service provider server 106 with the authorization amount (e.g., amount of the transaction) and the payment credential used.

At block 408, the service provider server 106 may authorize or reject the authorization request. The authorization may be based at least in part on the balance associated with the payment account. For example, before authorizing the transaction, the service provider server 106 may determine that the difference between the balance and the credit limit of the payment account is at least the authorization amount (e.g., the transaction amount). If the transaction is authorized, the service provider server 106 may transmit to the merchant device 104 an approval of the authorization amount, which may cause the merchant device 104 to complete the transaction with the user device 102 of the user. If the authorization request is rejected, the transaction is canceled and the process 400 ends.

At block 410, the service provider server 106 may update the balance associated with the payment account. The balance may be updated based at least in part on the authorization amount. For example, if the user is authorized to borrow up to $5000 and the transaction is for $100, the balance of the payment account may be increased from $0 to $100, which leaves $4900 for other transactions.

Because the transaction was paid from a loan, the service provider server 106 may also receive re-payment data from the user. Re-payment data may include the payment credential and a re-payment amount. The payment credential may identify the payment account to which the re-payment amount may be deducted. The balance of the payment account may be reduced by the re-payment amount. For example, if the transaction (and thus the balance of the payment account) was $1000 and the re-payment amount was $250, the remaining balance in the payment account would be $750. In one or more implementations, the re-payment data may be received according to a predetermined schedule of re-payments, such as every two weeks.

FIGS. 5A-5B depict a flow diagram of an example process 500 for modifying a financial product, in accordance with one or more implementations. For explanatory purposes, the process 500 is primarily described herein with reference to the user device 102, the merchant device 104, and the service provider server 106 of FIG. 1. However, the process 500 is not limited to the user device 102, the merchant device 104, or the service provider server 106, and one or more blocks of the process 500 may be performed by one or more other components of the service provider server 106, and/or by other suitable devices. Further, for explanatory purposes, the blocks of the process 500 are described herein as occurring sequentially or linearly. However, multiple blocks of the process 500 may occur in parallel. In addition, the blocks of the process 500 need not be performed in the order shown and/or one or more blocks of the process 500 need not be performed and/or can be replaced by other operations.

FIG. 5A depicts block 502 through block 510 of the process 500. At block 502, a server system (e.g., the service provider server 106) may receive a payment credential request from a user device (e.g., the user device 102). The payment credential request may include a requested amount. In one or more implementations, the payment credential request may also include user information such as name, address, payment credential, or any other information relevant payment information.

At block 504, the service provider server 106 may provision a payment credential. The payment credential may be a cryptogram, a SPAN, or any other form of payment token. The payment credential may be in a format for provisioning on the secure element 206 of the user device 102. The service provider server 106 may generate and provision the payment credential itself and/or request a payment credential be provisioned from a remote payment credential service (e.g., from a bank associated with the service provider server 106).

The service provider server 106 may also provision a payment account corresponding to the payment credential. The payment account may have a balance corresponding to the amount of credit used. For instance, the balance of the payment account may correspond to the requested amount.

The payment account may also have a credit limit determined by the service provider server 106 for the user for a particular financial product. For example, if the service provider server 106 determines that the user may be eligible for a $5000 pay later loan, the service provider server 106 may open a payment account with a $5000 credit limit, which may be utilized via the payment credential of the payment account as well as other payment credentials which may be subsequently generated for other pay later loan transactions for the user. The determination may be based on, for example, a payment history of the user, amount of funds associated with a payment credential provided in the request, and any other payment information.

At block 506, the service provider server 106 may receive an authorization request from a merchant system (e.g., the merchant device 104). A user device (e.g., the user device 102) may initiate a transaction with the merchant device 104 by providing the payment credential from its electronic wallet 302. As a result, the merchant device 104 may generate and send an authorization request to the service provider server 106, which may be via one or more intermediaries (e.g., an acquirer 304 and/or a payment network 306) typically used for credit/debit card transactions.

The authorization request may include a merchant identifier of the merchant system, the payment credential, as well as an authorization amount equivalent to the amount of the transaction. In some implementations, the authorization amount may be for an amount different than the amount of the transaction. Some categories of merchants may enter into transactions where the amount of the transaction is not final until sometime after the user has provided a payment credential. Accordingly, the terms of a transaction may be adjusted based on the category of the merchant, which may be indicated in the authorization request. For example, a restaurant may generate an authorization request with a merchant identifier indicating that it is a restaurant and an authorization amount up to 30% more than the total of food ordered to account for tips that may be added, although the settled amount may not necessarily be the total of the food ordered plus 30%.

In some implementations, the terms of a financial product may also be adjusted based on the category of the merchant. The service provider server 106 may adjust the credit limit of the payment account based on the authorization amount. If the authorization amount is greater than the credit limit of the payment account, for example, the service provider server 106 may increase the credit limit of the payment account to allow for payment of the authorization amount.

In some implementations, after the re-payment schedule is generated, a reserve request may be sent by the service provider server 106 to the re-payment server to reserve an amount on a re-payment account on the re-payment server from which re-payments may be made. The reserve amount may be based on the authorization amount and may be held such that the user cannot remove it from the re-payment account. For example, the reserve amount may be a quarter of the authorization amount in a four-payment pay later financing product.

When the authorization amount exceeds the requested amount by a threshold amount, the process 500 may proceed to block 510. Otherwise, the process 500 proceeds to block 508.

At block 508, the service provider server 106 may authorize the authorization amount when the authorization amount is less than or equal to the requested amount. In implementations where the amount in the re-payment account is reserved, the service provider server 106 may send to the re-payment server a release request with a release amount to release at least some of the reserved amount. For example, if the authorization amount is 10% less than the requested amount, then 10% of the reserved amount may be released.

At block 510, when the authorization amount exceeds the requested amount by the threshold amount, the service provider server 106 may authorize the authorization amount. The threshold amount that may be authorized may be based at least in part on the merchant identifier of the merchant.

FIG. 5B depicts block 512 through block 518 of the process 500. At block 512, the service provider server 106 may generate a re-payment schedule which indicates when and how much the user is to re-pay the payment account. The re-payment schedule may be based on the requested amount. For example, if the service provider server 106 authorizes the transaction for the requested amount (e.g., the authorization amount is the same amount as the requested amount), the balance of the account may be increased by the requested amount. To reduce the balance in the payment account, the user may re-pay certain amounts depending on the type of financial product used for the authorized transaction. For example, in a pay later financial product, there may be any number (e.g., four) of equal (or varying) partial re-payment amounts that sum to the requested amount where the first partial re-payment may be due every two weeks after the transaction until re-payment is complete.

The re-payments may come from a re-payment credential, such as a credit/debit card. The re-payment credential may be associated with a re-payment server, such as a bank server, which may be the same as and/or different from the service provider server 106. Re-payments may be debited from the re-payment credential and credited to the account to reduce the balance based on the re-payment schedule. In one or more implementations, the re-payment credential may be provided by the user in conjunction with the initial request and/or the re-payment credential may be subsequently provided and/or changed by the user, such as by interacting with the electronic wallet.

At block 514, the service provider server 106 may receive an indication of payment of the transaction. If the service provider server 106 authorizes the transaction, the merchant device 104 carries out the transaction (e.g., via the acquirer 304 and the payment network 306) and receives a payment from the payment account. An indication (e.g., a notification or confirmation) may be provided (e.g., by the merchant device 104, acquirer 304, and/or payment network 306) to the service provider server 106 that the payment has been sent to the user device 102.

At block 516, the service provider server 106 may determine whether the payment was for an amount different than the requested amount, in response to the indication of payment of the transaction. The service provider server 106 may determine the payment amount from the indication of the payment or the balance of the payment account, for example, and compare the payment amount to the requested amount from block 506 to determine whether the payment amount is different from the requested amount. For example, rather than receiving payment for a meal and a 30% tip as authorized, a restaurant may have only received payment for the meal and a 20% tip as specified by the user.

At block 518, if the payment amount is less than or equal to the requested amount, the service provider server 106 may activate the re-payment schedule. Activating the re-payment schedule may include generating one or more scheduled events (e.g., automated reminders, automated debits, and the like) corresponding to one or more re-payments (e.g., partial payments of the requested amount or whole payment of the requested amount).

At block 520, if the payment amount is greater than the requested amount, the service provider server 106 may update the account for the payment credential. Particularly, in some implementations, the service provider server 106 may generate an updated re-payment schedule. The updated re-payment schedule may be based on the first re-payment schedule. For example, if the payment clears after the user has already made the first partial re-payment, then the updated re-payment schedule may include the first partial re-payment but have different remaining partial re-payments such that the total re-payment still sums to the payment amount. The updated re-payment schedule may also or instead be based on the indication of payment of the transaction. For example, the total re-payment amount for the updated schedule may be the payment amount from the indication of payment of the transaction, and the re-payment amounts may also be determined based on the payment amount.

The updated re-payment schedule may also include a different number of partial re-payments. The amount of the partial re-payments and/or the number of partial re-payments may be updated such that the total of the partial re-payments amounts to a full re-payment of the payment amount. For example, if the original re-payment schedule called for four equal payments of $250 but the payment amount was actually $750, the service provider server 106 may generate an updated re-payment schedule that contains only three equal payments of $250.

In some implementations, when the updated re-payment schedule is generated, the service provider server 106 may send another reserve request to the re-payment server to update the reserve amount on the user's account commensurate to the payment amount. For example, if $250 was reserved based on a requested amount of $1000 and four equal payments, the updated reserve amount may be $200 based on a payment amount of $800 and four equal payments, which releases $50 from reservation on the user's account.

Figure 6:
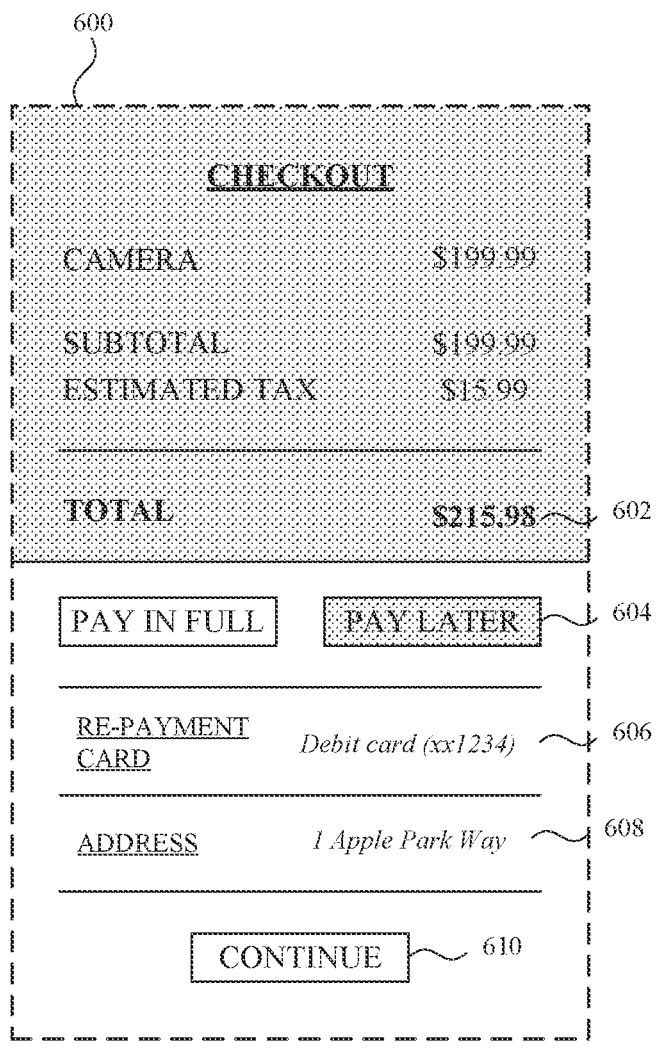
FIG. 6 depicts an example checkout interface on a mobile application, in accordance with one or more implementations.

FIG. 6 depicts an example checkout interface 600 on a mobile application, in accordance with one or more implementations. The mobile application may run on the user device 102 and include one or more items purchasable by the user device 102 via the checkout interface 600. The checkout interface 600 may include a list of items to be purchased by the user, such as a camera for $199.99. The mobile application may calculate and the checkout interface 600 may display a total amount 602, which may be the sum of the subtotal of the items to be purchased (e.g., $199.99) and the estimated tax associated with the transaction (e.g., $15.99). The checkout interface 600 may allow the user to pay in full or "pay later," as selected by the "pay later" button 604. To pay later, the user may provide the mobile application a re-payment card 606, which may be used to generate re-payment data. The user may also provide a billing/shipping address 608. To proceed with the transaction, the user may press the continue button 610, which may cause the user device 102 to display further information about the transaction and/or initiate a pay later financing product and request a payment credential associated with the pay later financing product, as described above with respect to process 400 and/or process 500.

Figure 7:
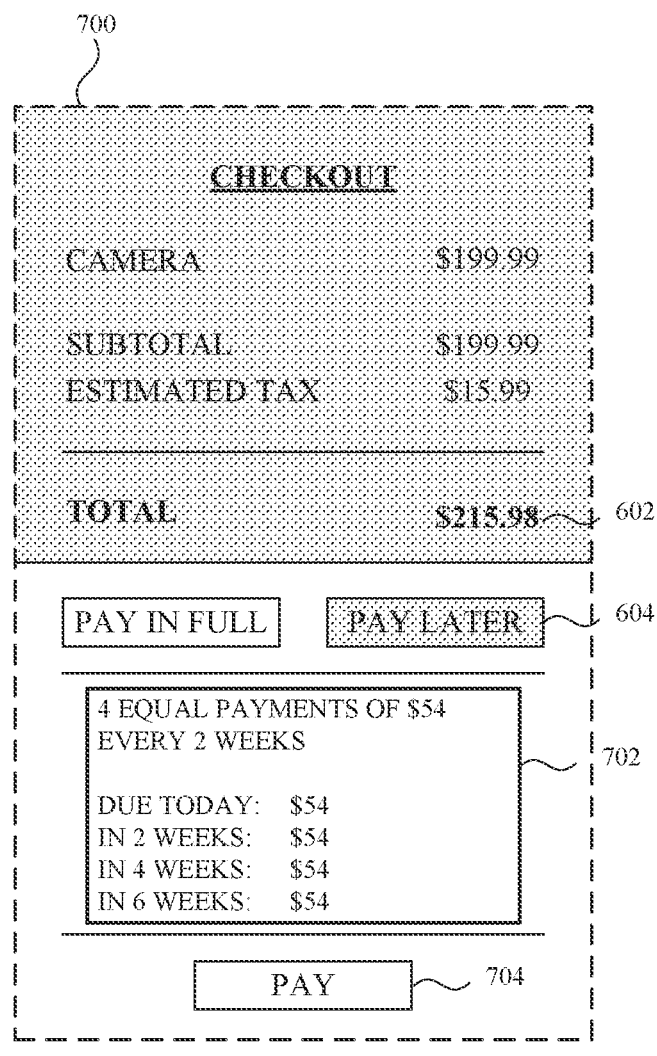
FIG. 7 depicts an example financial product interface on the mobile application of FIG. 6, in accordance with one or more implementations.

FIG. 7 depicts an example financial product interface 700 on the mobile application of FIG. 6, in accordance with one or more implementations. Before the user device 102 proceeds with the transaction, the user device 102 may simulate the effects of the financial product to inform the user of potential consequences. For example, before or after initiating the financial product, the financial product interface 700 may present a payment schedule 702, which in this case may be four equal biweekly payments equaling in total the total amount 602. In some implementations, other information may be presented, such as potential late fees, options to change payment dates/amounts, other financial products available, and the like. To proceed with the transaction may press the pay button 704, which may cause the user device 102 to initiate a pay later financing product and request a payment credential associated with the pay later financing product, as described above with respect to FIGS. 4, 5A, and/or 5B.

Figure 8:
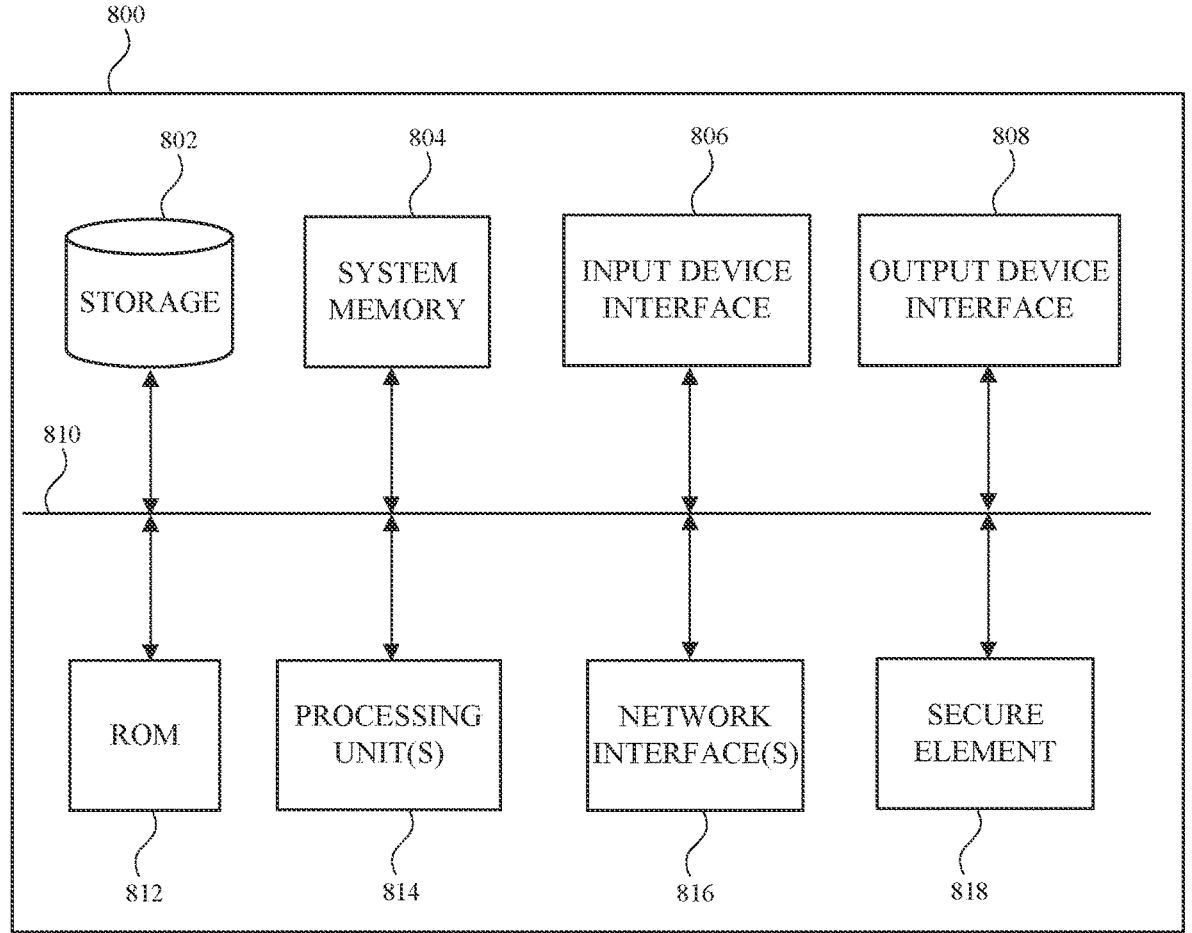
FIG. 8 depicts an example electronic system with which aspects of the present disclosure may be implemented in accordance with one or more implementations.

FIG. 8 depicts an example electronic system 800 with which aspects of the present disclosure may be implemented, in accordance with one or more implementations. The electronic system 800 can be, and/or can be a part of, any electronic device for generating the features and processes described in reference to FIGS. 1-7, including but not limited to a laptop computer, tablet computer, smartphone, and wearable device (e.g., smartwatch, fitness band). The electronic system 800 may include various types of computer-readable media and interfaces for various other types of computer-readable media. The electronic system 800 includes a persistent storage device 802, a system memory 804 (and/or buffer), an input device interface 806, an output device interface 808, a bus 810, a ROM 812, one or more processing unit(s) 814, one or more network interface(s) 816, a secure element 818, and/or subsets and variations thereof.

The bus 810 collectively represents all system, peripheral, and chipset buses that communicatively connect the numerous internal devices of the electronic system 800. In one or more implementations, the bus 810 communicatively connects the one or more processing unit(s) 814 with the ROM 812, the system memory 804, and the persistent storage device 802. From these various memory units, the one or more processing unit(s) 814 retrieves instructions to execute and data to process in order to execute the processes of the subject disclosure. The one or more processing unit(s) 814 can be a single processor or a multi-core processor in different implementations.

The ROM 812 stores static data and instructions that are needed by the one or more processing unit(s) 814 and other modules of the electronic system 800. The persistent storage device 802, on the other hand, may be a read-and-write memory device. The persistent storage device 802 may be a non-volatile memory unit that stores instructions and data even when the electronic system 800 is off. In one or more implementations, a mass-storage device (such as a magnetic or optical disk and its corresponding disk drive) may be used as the persistent storage device 802.

In one or more implementations, a removable storage device (such as a floppy disk, flash drive, and its corresponding disk drive) may be used as the persistent storage device 802. Like the persistent storage device 802, the system memory 804 may be a read-and-write memory device. However, unlike the persistent storage device 802, the system memory 804 may be a volatile read-and-write memory, such as RAM. The system memory 804 may store any of the instructions and data that one or more processing unit(s) 814 may need at runtime. In one or more implementations, the processes of the subject disclosure are stored in the system memory 804, the persistent storage device 802, and/or the ROM 812. From these various memory units, the one or more processing unit(s) 814 retrieves instructions to execute and data to process in order to execute the processes of one or more implementations.

The bus 810 also connects to the input device interfaces 806 and output device interfaces 808. The input device interface 806 enables a user to communicate information and select commands to the electronic system 800. Input devices that may be used with the input device interface 806 may include, for example, alphanumeric keyboards, touch screens, and pointing devices. The output device interface 808 may enable the electronic system 800 to communicate information to users. For example, the output device interface 808 may provide the display of images generated by electronic system 800. Output devices that may be used with the output device interface 808 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 810 also connects to secure element 818. The secure element 818 may include hardware and/or software that provides secure storage and management of sensitive information. The secure element 818 may be isolated from the processing unit 814 and operating system, making it more difficult for unauthorized access. The secure element 818 may be used for secure transactions and identification, such as in payment cards/credentials and digital passes. The secure element 818 may store sensitive information, such as cryptographic keys, and may protect the sensitive information (e.g., with cryptographic algorithms and access controls).

Finally, as shown in FIG. 8, the bus 810 also couples the electronic system 800 to one or more networks and/or to one or more network nodes through the one or more network interface(s) 816. In this manner, the electronic system 800 can be a part of a network of computers (such as a local area network, a wide area network, an Intranet, or a network of networks, such as the Internet). Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more computer-readable instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more implementations are performed by one or more integrated circuits, such as ASICs or FPGAs. In one or more implementations, such integrated circuits execute instructions that are stored on the circuit itself.

As described above, one aspect of the present technology is the gathering and use of data available from specific and legitimate sources for file sharing. The present disclosure contemplates that in some instances, this gathered data may include personal information data that uniquely identifies or can be used to identify a specific person. Such personal information data can include demographic data, location-based data, online identifiers, telephone numbers, email addresses, home addresses, images, videos, audio data, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, personal information data can be used for file sharing. Accordingly, the use of such personal information data may facilitate transactions (e.g., online transactions). Further, other uses for personal information data that benefit the user are also contemplated by the present disclosure. For instance, health and fitness data may be used, in accordance with the user's preferences to provide insights into their general wellness or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of file sharing, the present technology can be configured to allow users to select to "opt-in" or "opt-out" of participation in the collection of personal information data during registration for services or anytime thereafter. In addition to providing "opt-in" and "opt-out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed implementations, the present disclosure also contemplates that the various implementations can also be implemented without the need for accessing such personal information data. That is, the various implementations of the present technology are not rendered inoperable due to the lack of all or a portion of such personal information data.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, one or more implementations, an embodiment, the embodiment, another embodiment, one or more implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:

in lieu of a user device providing an existing credential to a merchant system in an operation between the user device and the merchant system, receiving, by a server system, a payment credential request for a new payment credential from the user device, wherein the payment credential request comprises a requested amount and a re-payment credential and indicates a product type, wherein the payment credential request corresponds to an initiation of an authorization request originating at the user device for the operation between the user device and the merchant system;

storing, by the server system, the re-payment credential for a subsequent use by the server system and verifying that the re-payment credential can be used to obtain a partial payment amount of the requested amount;

following the initiation of the authorization request and the verification of the re-payment credential, provisioning, by the server system in response to the payment credential request and based at least in part on the product type, a payment credential and a payment account corresponding to the payment credential and associated with a balance corresponding to the requested amount, wherein provisioning the payment credential comprises:

provisioning, by the server system and on a secure element of the user device, the payment credential, the provisioned payment credential comprising a cryptographic token corresponding to the payment account, wherein following the provisioning, the user device provides the cryptographic token in association with an authorization amount to the merchant system as part of the operation between the user device and the merchant system;

receiving, by the server system and from the merchant system, an indication of the authorization amount and the cryptographic token;

determining, by the server system and based at least in part on the balance associated with the payment account, that the operation between the user device and the merchant system is authorized and, as a result of determining that the operation between the user device and the merchant system is authorized, that payment of the authorization amount to the merchant system can be performed;

in response to determining that payment of the authorization amount to the merchant system can be performed, transmitting, by the server system and to the merchant system, an approval of the authorization amount;

obtaining, by the server system, a partial payment from the re-payment credential; and updating, by the server system, the balance associated with the payment account based at least in part on the authorization amount and the partial payment from the re-payment credential, in response to authorizing the payment.

2. The method of claim 1, wherein provisioning the payment credential comprises:

generating the cryptographic token for the payment account.

3. The method of claim 1, wherein the payment credential request further comprises user identifying information corresponding to a user associated with the user device, and provisioning the payment account comprises:

determining, based at least in part on the user identifying information, whether the user is authorized for the requested amount; and in response to a determination that the user is authorized for the requested amount, generating the payment account associated with the balance corresponding to the requested amount.

4. The method of claim 1, wherein provisioning the secure element of the user device further comprises:

transmitting to a provisioning service executing on a separate server, a request for provisioning the payment credential.

5. The method of claim 1, wherein authorizing payment of the authorization amount to the merchant system comprises:

determining whether the balance of the payment account is at least the authorization amount.

6. The method of claim 1, wherein updating the balance of the payment account by the authorization amount comprises:

transmitting, to the merchant system, the payment of the authorization amount; and increasing the balance of the payment account associated with the payment credential by the authorization amount, in response to transmitting the payment of the authorization amount.

7. The method of claim 1, wherein the payment credential request comprises another payment credential, and authorizing the payment of the authorization amount to the merchant system is also based at least in part on the other payment credential.

8. The method of claim 1, further comprising:

receiving, from the user device, a re-payment data comprising a re-payment amount that is at least part of the balance of the payment account; and decreasing the balance of the payment account associated with the payment credential by the re-payment amount.

9. The method of claim 8, wherein the re-payment data is received in accordance with a predetermined schedule of a plurality of re-payment data.

10. A system comprising:

a memory; and a processor circuit configured to:

in lieu of a user device providing an existing credential to a merchant system in an operation between the user device and the merchant system, receive a payment credential request from the user device, wherein the payment credential request for a new payment credential comprises a requested amount and a re-payment credential and indicates a product type, wherein the payment credential request corresponds to an initiation of an authorization request originating at the user device for the operation between the user device and the merchant system;

store the re-payment credential for a subsequent use by the system and verify that the re-payment credential can be used to obtain a partial payment amount of the requested amount;

following the initiation of the authorization request and verification of the re-payment credential, provision, in response to the payment credential request and based at least in part on the product type, a payment credential and a payment account corresponding to the payment credential and associated with a balance corresponding to the requested amount, wherein provisioning the payment credential comprises:

provisioning on a secure element of the user device, the payment credential, the provisioned payment credential comprising a cryptographic token corresponding to the payment account, wherein following the provisioning, the user device provides the cryptographic token in association with an authorization amount to the merchant system as part of the operation between the user device and the merchant system;

receive, from the merchant system, an indication of the authorization amount and the cryptographic token;

determine, based at least in part on the balance associated with the payment account, that the operation between the user device and the merchant system is authorized and, as a result of determining that the operation between the user device and the merchant system is authorized, that payment of the authorization amount to the merchant system can be performed;

in response to determining that payment of the authorization amount to the merchant system can be performed, transmit to the merchant system, an approval of the authorization amount;

obtaining a partial payment from the re-payment credential; and update the balance associated with the payment account based at least in part on the authorization amount, in response to authorizing the payment and the partial payment from the re-payment credential.

11. The system of claim 10, wherein provisioning the payment credential comprises:

generating the cryptographic token for the payment account.

12. The system of claim 10, wherein the payment credential request further comprises user identifying information corresponding to a user associated with the user device, and provisioning the payment account comprises:

determining, based at least in part on the user identifying information, whether the user is authorized for the requested amount; and in response to a determination that the user is authorized for the requested amount, generating the payment account associated with the balance corresponding to the requested amount.

13. The system of claim 10, wherein the processor circuit is also configured to:

transmit to a provisioning service executing on a separate server, a request for provisioning the payment credential.

14. The system of claim 10, wherein authorizing payment of the authorization amount to the merchant system comprises:

determining whether the balance of the payment account is at least the authorization amount.

15. The system of claim 10, wherein updating the balance of the payment account by the authorization amount comprises:

transmitting, to the merchant system, the payment of the authorization amount; and increasing the balance of the payment account associated with the payment credential by the authorization amount, in response to transmitting the payment of the authorization amount.

16. The system of claim 10, wherein the payment credential request comprises another payment credential, and authorizing the payment of the authorization amount to the merchant system is also based at least in part on the other payment credential.

17. The system of claim 10, wherein the processor circuit is also configured to:

receive, from the user device, a re-payment data comprising a re-payment amount that is at least part of the balance of the payment account; and decrease the balance of the payment account associated with the payment credential by the re-payment amount.

18. The system of claim 17, wherein the re-payment data is received in accordance with a predetermined schedule of a plurality of re-payment data.

19. A non-transitory computer-readable medium storing instructions that, when executed by a processor, causes the processor to perform operations comprising:

in lieu of a user device providing an existing credential to a merchant system in an operation between the user device and the merchant system, receiving, by a server system, a payment credential request for a new payment credential from the user device, wherein the payment credential request comprises a requested amount and a re-payment credential and indicates a product type, wherein the payment credential request corresponds to an initiation of an authorization request originating at the user device for the operation between the user device and the merchant system;

storing the re-payment credential for a subsequent use by the server system and verifying that the re-payment credential can be used to obtain a partial payment amount of the requested amount;

following the initiation of the authorization request and the verification of the re-payment credential, provisioning, by the server system in response to the payment credential request and based at least in part on the product type, a payment credential and a payment account corresponding to the payment credential and associated with a balance corresponding to the requested amount, wherein provisioning the payment credential comprises:

provisioning, by the server system and on a secure element of the user device, the payment credential, the provisioned payment credential comprising a cryptographic token corresponding to the payment account, wherein following the provisioning, the user device provides the cryptographic token in association with an authorization amount to the merchant system as part of the operation between the user device and the merchant system;

receiving, by the server system and from the merchant system, an indication of the authorization amount and the cryptographic token;

determining, by the server system and based at least in part on the balance associated with the payment account, that the operation between the user device and the merchant system is authorized and, as a result of determining that the operation between the user device and the merchant system is authorized, that payment of the authorization amount to the merchant system can be performed;

in response to determining that payment of the authorization amount to the merchant system can be performed, transmitting, by the server system and to the merchant system, an approval of the authorization amount;

obtaining a partial payment from the re-payment credential; and updating, by the server system, the balance associated with the payment account based at least in part on the authorization amount, in response to authorizing the payment and the partial payment from the re-payment credential.

20. The non-transitory computer-readable medium of claim 19, wherein provisioning the payment credential comprises:

generating the cryptographic token for the payment account.

* * * * *